(12) United States Patent
Huang et al.

(10) Patent No.: US 11,573,119 B2
(45) Date of Patent: Feb. 7, 2023

(54) METHOD AND APPARATUS FOR DYNAMICALLY ESTIMATING VEHICLE MASS

(71) Applicant: GM Global Technology Operations LLC, Detroit, MI (US)

(72) Inventors: Xiaoyu Huang, Troy, MI (US); Xueying Kang, Novi, MI (US); Hualin Tan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1055 days.

(21) Appl. No.: 16/250,380

(22) Filed: Jan. 17, 2019

(65) Prior Publication Data
US 2020/0232842 A1 Jul. 23, 2020

(51) Int. Cl.
  *G01G 11/00* (2006.01)
  *G01G 19/08* (2006.01)
  *B60W 30/14* (2006.01)
  *B60W 40/13* (2012.01)

(52) U.S. Cl.
  CPC ......... *G01G 19/086* (2013.01); *B60W 30/143* (2013.01); *B60W 40/13* (2013.01); *B60W 2510/0657* (2013.01); *B60W 2520/105* (2013.01); *B60W 2530/10* (2013.01)

(58) Field of Classification Search
  CPC .. G01G 19/086; B60W 30/143; B60W 40/13; B60W 2510/0657; B60W 2520/105; B60W 2530/10
  See application file for complete search history.

(56) References Cited

U.S. PATENT DOCUMENTS

| 10,204,461 B2 * | 2/2019 | Chen .................. G05B 23/0221 |
| 2013/0138288 A1 | 5/2013 | Nickolaou et al. |
| 2016/0090006 A1 * | 3/2016 | Yamazaki ............. B60W 10/08 701/22 |

FOREIGN PATENT DOCUMENTS

| CN | 105849514 A |   | 8/2016 |
| CN | 107310558 A |   | 11/2017 |
| CN | 108944935 A | * | 12/2018 |
| JP | 11211548 A |   | 8/1999 |
| JP | 2010249597 A |   | 11/2010 |
| JP | 2014145598 A |   | 8/2014 |
| WO | 2010034578 A1 |   | 4/2010 |

* cited by examiner

*Primary Examiner* — Adam M Alharbi
(74) *Attorney, Agent, or Firm* — Quinn IP Law

(57) ABSTRACT

A method for dynamically determining a mass of a vehicle including a propulsion system coupled to a drive wheel is described, and includes monitoring vehicle operating conditions, executing an event-based estimation method based upon the vehicle operating conditions to determine a first vehicle mass state, and executing a recursive estimation method based upon the vehicle operating conditions to determine a second vehicle mass state. A final vehicle mass is determined based upon the first and second vehicle mass states.

18 Claims, 6 Drawing Sheets

METHOD AND APPARATUS FOR DYNAMICALLY ESTIMATING VEHICLE MASS

INTRODUCTION

Vehicle control systems monitor, estimate and otherwise dynamically determine a variety of parameters that are employed in a variety of vehicle control subsystems, including, e.g., total mass of the vehicle. The dynamic determination of total mass of the vehicle may be employed by algorithms for proper gear changing control in a transmission, motor torque output control for an electric propulsion system to achieve a desired acceleration rate, control of braking force in an antilock brake system, speed control systems for use with an active speed control system, etc. Total vehicle mass can vary, depending upon quantity of passengers, addition of payload, and/or addition of a trailer. In addition, measurement signal noise may cause estimation errors that reduce the reliability of a dynamic estimation of the vehicle mass, and thus affect robustness of the on-vehicle systems that employ vehicle mass for operational control.

SUMMARY

A method for dynamically determining a mass of a vehicle including a propulsion system coupled to a drive wheel is described, and includes monitoring vehicle operating conditions, executing an event-based estimation method based upon the vehicle operating conditions to determine a first vehicle mass state, and executing a recursive estimation method based upon the vehicle operating conditions to determine a second vehicle mass state. A final vehicle mass is determined based upon the first and second vehicle mass states.

An aspect of the disclosure includes executing the recursive estimation method based upon the vehicle operating conditions to determine the second vehicle mass state, including recursively determining a longitudinal acceleration of the vehicle and an axle torque being transferred from the propulsion system to the drive wheel based upon the monitored vehicle operating conditions, and determining the second vehicle mass state based upon the recursively determined longitudinal acceleration and the axle torque.

Another aspect of the disclosure includes determining the longitudinal acceleration based upon input from an inertial measurement sensor.

Another aspect of the disclosure includes determining the second vehicle mass state based upon the recursively determined longitudinal acceleration and the axle torque, including executing a Kalman filter to determine the second vehicle mass state based upon the recursively determined longitudinal acceleration and the axle torque.

Another aspect of the disclosure includes recursively determining the longitudinal acceleration of the vehicle and coincidently determining the axle torque being transferred to the vehicle.

Another aspect of the disclosure includes determining that the vehicle is operating in a straight-line state as a condition-precedent to executing the event-based estimation method and executing the recursive estimation method.

Another aspect of the disclosure includes executing the event-based estimation method based upon the vehicle operating conditions to determine the first vehicle mass state, including determining a longitudinal force and a longitudinal acceleration at a selected vehicle speed during a first operating state, transitioning to a second operating state, determining a longitudinal force and a longitudinal acceleration at the selected vehicle speed during the second operating state, and determining the first vehicle mass state based upon a difference between the longitudinal acceleration at the selected vehicle speed during the first operating state and the longitudinal acceleration at the selected vehicle speed during the second operating state.

Another aspect of the disclosure includes determining the first vehicle mass state based upon a braking force exerted on the vehicle wheels under the first operating state at the selected vehicle speed, a braking force exerted on the vehicle wheels under the second operating state at the selected vehicle speed, and a driving force exerted by the vehicle propulsion system on the drive wheels at the selected vehicle speed.

Another aspect of the disclosure includes the first operating state being a vehicle acceleration event and the second operating state being a vehicle deceleration event.

Another aspect of the disclosure includes the first operating state being a vehicle acceleration event and the second operating state being a vehicle coasting event.

Another aspect of the disclosure includes the first operating state being a vehicle deceleration event and the second operating state being a vehicle acceleration event.

Another aspect of the disclosure includes executing the event-based estimation method based upon the vehicle operating conditions to determine the first vehicle mass state, including determining a loaded wheel radius for the vehicle wheel, determining an axle torque, determining vehicle longitudinal force based upon the loaded wheel radius and the axle torque, and determining the first vehicle mass state based upon the vehicle longitudinal force.

Another aspect of the disclosure includes determining the vehicle longitudinal force based upon the loaded wheel radius, including determining the loaded wheel radius for the drive wheel based upon a rotational speed of the vehicle wheel and a longitudinal speed of the vehicle, determining a deflection of the vehicle wheel based upon the loaded wheel radius, and determining the vehicle longitudinal force based upon the deflection of the vehicle wheel and the axle torque.

Another aspect of the disclosure includes the vehicle including a plurality of wheels, and wherein executing the event-based estimation method based upon the vehicle operating conditions to determine the first vehicle mass state includes determining a loaded wheel radius for the driven wheels, determining a total vehicle longitudinal force based upon the radii for the vehicle driven wheels, and determining the first vehicle mass state based upon the vehicle longitudinal force.

Another aspect of the disclosure includes controlling vehicle operation based upon the final vehicle mass.

Another aspect of the disclosure includes determining the final vehicle mass based upon the first and second vehicle mass states includes determining the final vehicle mass based upon a weighted average of the first and second vehicle mass states.

Another aspect of the disclosure includes identifying outliers from the event-based mass estimations, removing the outliers from the event-based mass estimations, and determining the final vehicle mass based upon a weighted average of the first and second vehicle mass states after the outliers associated with the event-based mass estimations have been removed.

Another aspect of the disclosure includes a vehicle, including a body disposed on a plurality of vehicle wheels via a suspension system, a propulsion system configured to transfer propulsion torque to one of the vehicle wheels, a plurality of sensors disposed to monitor the vehicle wheels, the body, the suspension system and the propulsion system and a controller, in communication with the plurality of sensors and operatively connected to the propulsion system and the suspension system. The controller includes an instruction set that is executable to monitor, via the plurality of sensors, vehicle operating conditions, determine a vehicle wheel radius based upon the vehicle operation conditions, determine a first vehicle longitudinal force based upon the vehicle wheel radius, execute an event-based estimation method to determine a first vehicle mass state based upon the first vehicle longitudinal force, execute a recursive estimation method to determine a second vehicle mass state based upon the vehicle operating conditions, determine a final vehicle mass based upon the first and second vehicle mass states and control operation of one of the propulsion system and the suspension system based upon the final vehicle mass.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically shows wheel-based parameters associated with dynamically determining a wheel radius on a vehicle, in accordance with the disclosure.

FIG. 3-2 graphically illustrates a relationship between wheel load and tire deflection under different tire inflation levels for an embodiment of the vehicle wheel that is shown with reference to FIG. 1

FIG. 4-1 graphically shows data associated with a transition from a first operating state to a second operating state, in the form of a transition from a vehicle acceleration state to a vehicle coasting state, which may be employed to dynamically estimate a first vehicle mass, in accordance with the disclosure.

FIG. 4-2 graphically shows data associated with a transition from a first operating state to a second operating state, in the form of a transition from a vehicle acceleration state to a vehicle deceleration state, which may be employed to dynamically estimate a first vehicle mass, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
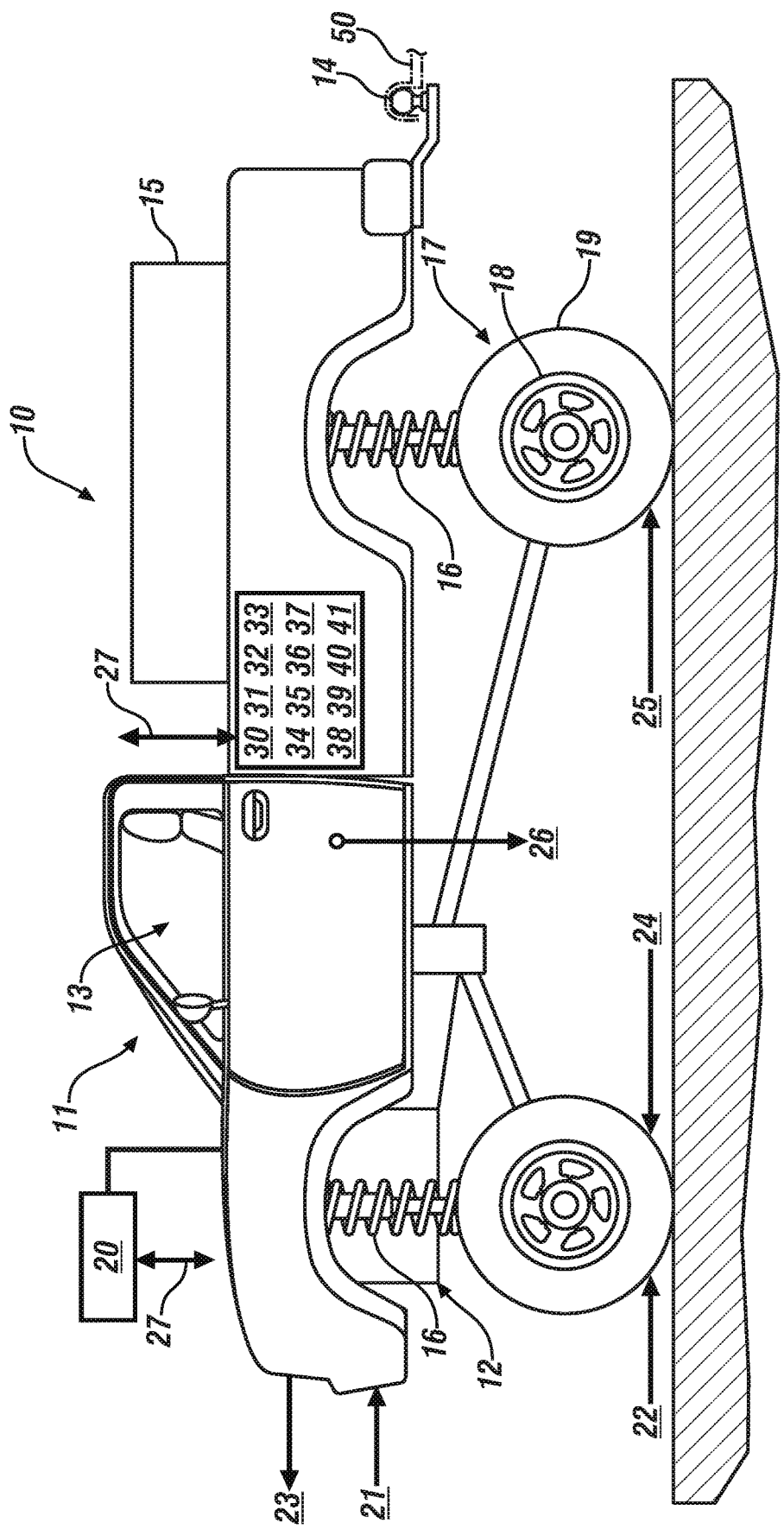
FIG. 1 schematically shows a side view of a vehicle, in accordance with the disclosure.

Referring to the drawings, wherein like reference numerals correspond to like or similar components throughout the several Figures, FIG. 1, consistent with embodiments disclosed herein, illustrates a vehicle 10 that is disposed on a plurality of vehicle wheels 17 and having a mass 26. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The mass 26 of the vehicle 10 may be subject to variation due to effects of quantity and/or size of passengers in a passenger compartment 13, magnitude of a payload 15, and/or presence or absence of a trailer 50 or another towed vehicle that may be coupled to a trailer hitch 14.

In one embodiment, the vehicle 10 is disposed on a plurality of vehicle wheels 17, and includes a body 11 including the passenger compartment 13 and a payload area 15, wherein the payload area 15 may be a trunk such as may be found on a sedan or other passenger vehicle, a rear compartment such as may be found on a sport-utility vehicle, or a bed such as may be found on a pickup truck. The vehicle wheels 17 include one or more drive wheels and may also include one or more driven wheels, depending upon a quantity of the vehicle wheels 17 and a driveline configuration of the vehicle 10, e.g., whether the vehicle 10 is configured in and operating in a two-wheel drive arrangement, a four-wheel drive arrangement, or an all-wheel drive arrangement.

In one embodiment, each of vehicle wheels 17 includes an inflatable tire 19 that is mounted on a rim 18, and is disposed on an axle of the vehicle 10. The vehicle 10 further includes a propulsion system 12, which may include an internal combustion engine, electric motor or another prime mover, a geartrain including a step-gear transmission or a CVT, a drivetrain that may include a differential and a transfer case, axles and other elements. The propulsion system 12 is arranged to transfer torque to one or more of the vehicle wheels 17, wherein such wheels are referred to as drive wheels. Any of the vehicle wheels 17 that are not arranged to transfer torque from the propulsion system 12 to ground are referred to as driven wheels. A suspension system 16 couples the vehicle wheels 17 and axles to the body 11. The vehicle 10 includes a plurality of sensors that are advantageously disposed at appropriate locations to monitor states of various parameters, including, by way of non-limiting examples, wheel speed sensors 30, a Global Positioning System (GPS) sensor 31, a steering angle sensor 32, a brake pedal sensor 33, an accelerator pedal sensor 34, a transmission range selector sensor 35, an axle torque sensor 36, an ambient air temperature sensor 37, a yaw sensor 38, a longitudinal acceleration sensor 39, a towing hitch in-use sensor 40 and tire pressure monitoring system (TPMS) sensors 41. The aforementioned sensors are illustrative, and some may be replaced by functionally equivalent devices or models that are able to detect or otherwise determine the respective parameter. Each of the aforementioned sensors is in communication with the controller 20, either directly or via a bus. Some of the aforementioned sensors may be in the form of rotational position sensors, linear position sensors, ultrasonic sensors, laser sensors and inertial-based acceleration sensors. A heading angle calculation may be determined from a pitot tube or other vehicle dynamics information providing inertial estimates. An air density calculation may be derived from manifold absolute pressure and outside air temperatures.

Forces acting upon the vehicle 10 include aerodynamic drag Fa $F_r$ 21, wheel friction $F_r$ 22, vehicle speed $V_x$ 23, driving force $F_d$ 24, braking force $F_b$ 25, and the vehicle mass 26.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, which are indicated by link 27. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model. A parameter can have a discrete value, e.g., either "1" or "0", or can be infinitely variable in value.

The concepts described herein provide an integrated approach to determine the mass 26 of the vehicle 10 by employing an event-based estimation method in conjunction with a recursive estimation method. As such, robustness may be enhanced by more efficient compensation for uncertainties with better selected events, and accuracy may be improved by removing outliers caused by measurement noise.

As described with reference to FIG. 2, et seq., a process 200, in the form of executable routines and calibrations, may be executed during vehicle operation to dynamically estimate a final vehicle mass 295 of the vehicle 10. The process 200 includes employing a first, event-based estimation method 400 to dynamically determine a first estimate of the vehicle mass 275, and employing a second, recursive estimation method 600 to dynamically determine a second estimate of the vehicle mass 285. An outlier removal step 500 is executed to detect and remove or otherwise compensate for presence of outlier data associated with the first estimate of the vehicle mass 275 that may be generated by the event-based estimation method 400. An integration step 700 is executed to determine the final vehicle mass 295 based upon the first and second estimates of the vehicle mass 275, 285, which is communicated to vehicle control systems for operational control of the vehicle 10. The first, event-based estimation method 400 to dynamically determine the first estimate of the vehicle mass 275 is described with reference to FIGS. 4-1 and 4-2. The recursive estimation method 600 to dynamically determine the second estimate of the vehicle mass 285 is described with reference to FIG. 6. The outlier removal step 500 is described with reference to FIG. 5. The teachings may be described herein in terms of functional and/or logical block components and/or various processing steps. It should be realized that such block components may be composed of hardware, software, and/or firmware components that have been configured to perform the specified functions to yield the indicated result.

Referring again to FIG. 2, vehicle parameters, including vehicle operating parameters as determined based upon inputs from vehicle sensors and other sources, and vehicle information, are employed as inputs to determine states of information that can be employed in estimating the vehicle mass and in determining enable criteria. The elements include an output 215 from a triggering condition routine 210, an output 225 from an event detection routine 220, a loaded wheel radius 233 from a wheel radius estimation routine 230 and a longitudinal force estimation routine 235, a straight-line detection routine 240, an enable criteria evaluation routine 250, and a wind resistance estimation routine 260.

The wheel radius estimation routine 230 determines a loaded wheel radius 233 based upon inputs 203, which include a GPS-based vehicle speed, wheel speed(s) that are determined from the wheel speed sensor(s) 30, tire pressure that is determined from the TPMS 41, and vehicle dimensional information that may be predetermined and stored in the controller 20. The loaded wheel radius 233 may be employed to determine a vehicle longitudinal force $F_x$ based upon an axle torque that may be determined by the axle torque sensor 36, or a functional equivalent.

Figures 1, 3:
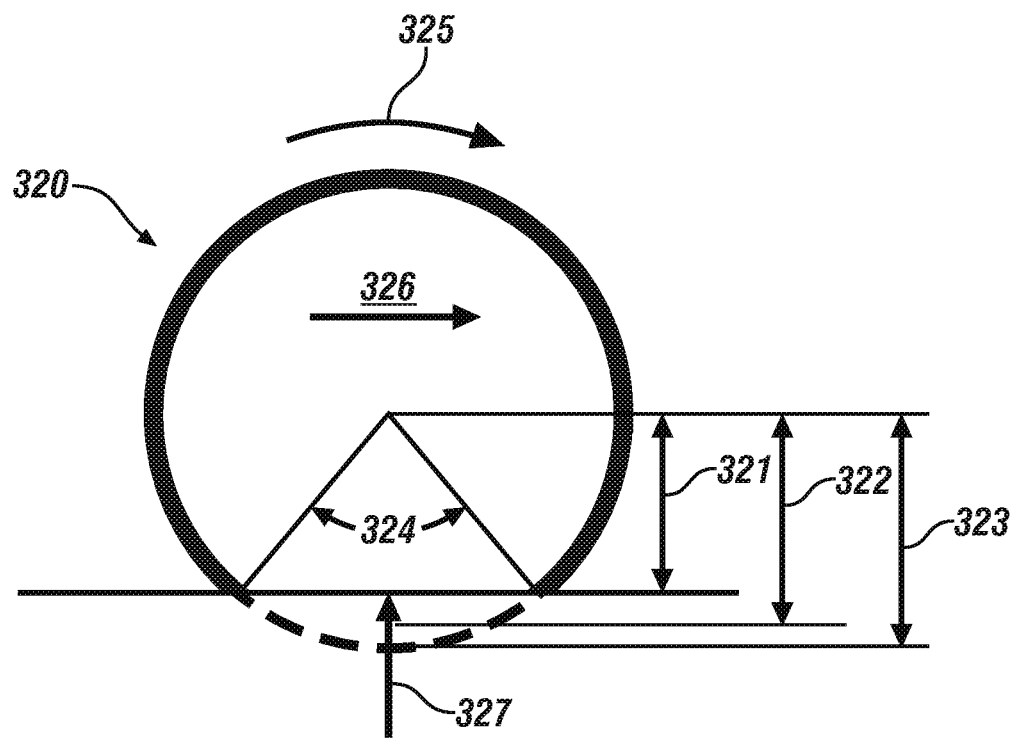
Figures 2, 3:
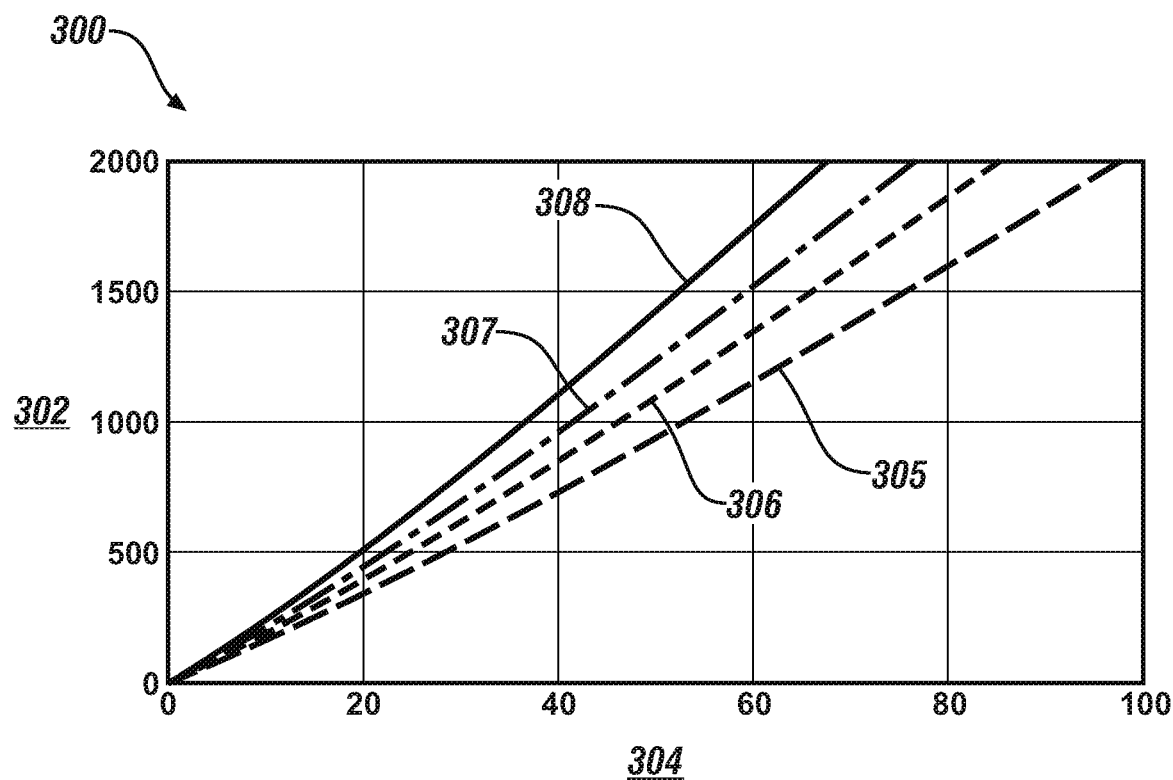

Referring now to FIG. 3-1, an effective wheel radius can be determined as follows:

$$R_e = V_{x,GPS}/\omega \quad [1]$$

wherein:

$R_e$ is the effective wheel radius, $V_{x,GPS}$ is the vehicle speed as determined based upon input from the GPS system, and $\omega$ is the rotational wheel speed, as determined based upon input from the wheel speed sensors.

The loaded wheel radius can be approximated as follows when a surface contact angle β is less than 20°:

$$R_l = 3R_e - 2R_u \quad [2]$$

wherein:

$R_l$ is the loaded wheel radius, $R_e$ is the effective wheel radius, from Eq. 1, above, and $R_u$ is a radius of the wheel in an unloaded state, which is a wheel-specific calibrated value that may be empirically determined.

Parameters associated with determining the effective wheel radius are schematically shown with reference to FIG. 3-1, including the vehicle wheel 320, the loaded wheel radius $R_l$ 321, the effective wheel radius $R_e$ 322, the unloaded wheel radius $R_u$ 323, a contact angle β that is multiplied by 2, or 2β 324, the rotational wheel speed ω 325, and vehicle speed $V_{x,GPS}$ is 326. Vertical force $F_z$ 327, representing the vehicle load on the respective corner of the vehicle 10, is also indicated.

Figure 2:
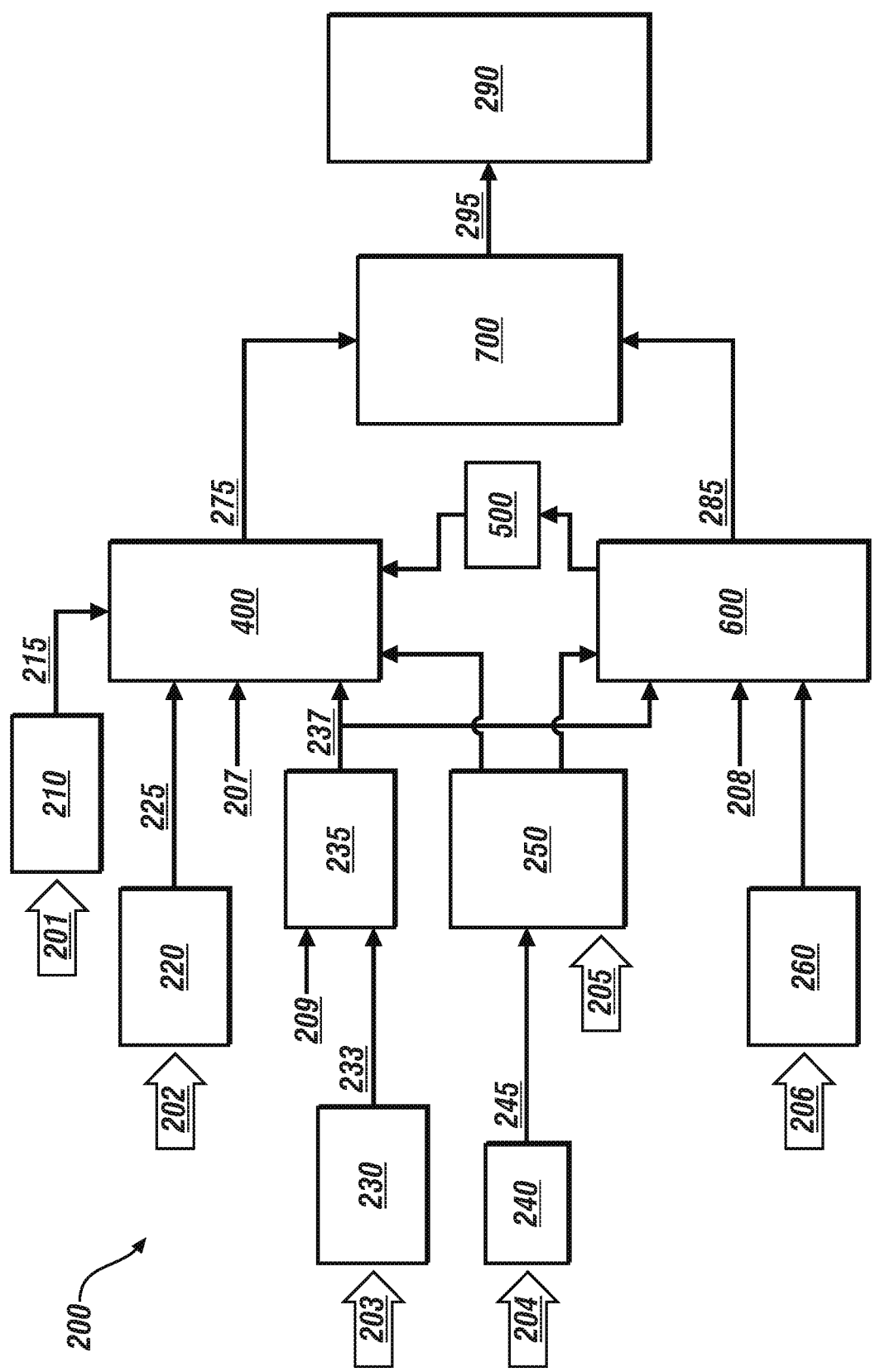
FIG. 2 schematically shows a control routine for determining vehicle mass, in accordance with the disclosure.

FIG. 3-2 graphically illustrates a relationship between wheel load, on the vertical axis 302, and tire deflection, on the horizontal axis 304 for one of the vehicle wheels 17 that is shown with reference to FIG. 1. The relation is illustrated for four levels of tire pressure, including 150 kPa 305, 180 kPa 306, 210 kPa 307 and 240 kPa 308, and is shown in relation to an unloaded wheel, for a vehicle wheel. As appreciated, the tire pressure can be determined in-use employing input from a tire pressure sensor of the TPMS 41. As illustrated, and appreciated by skilled practitioners, at a selected load level, the wheel deflection increases with a decrease in tire pressure. This relationship between wheel load and wheel deflection can be empirically determined and stored as a calibration value in a memory device of the controller 20.

Referring again to FIG. 2, the loaded wheel radius 233 can be used to determine vehicle load on a respective corner of the vehicle 10. In one embodiment, a 10% change in the wheel load causes a change in wheel radius that is less than 1%. However, a 10% change in the wheel load can cause a vehicle mass estimation error of greater than 10% if unaccounted for, and is difficult to compensate for in an event-based vehicle mass estimation algorithm, such as the first, event-based estimation method 400 to dynamically determine the first estimate of the vehicle mass 275.

The loaded wheel radius 233 and axle torque 209 are provided as inputs to a longitudinal force estimation routine 235. The longitudinal force estimation routine 235 dynamically determines a longitudinal force Fx 237 based upon the loaded wheel radius 233 and the axle torque 209 employing the Newtonian physics relationship between torque, force and moment arm.

The straight-line detection routine 240 evaluates vehicle dynamics parameters 204, including yaw rate, lateral acceleration, steering angle and wheel speed, to determine whether the vehicle 10 is operating in a straight line. An output 245 is generated by the straight-line detection routine 240, and indicates either operation of the vehicle 10 in a straight line or operation in another, non-straight line state.

The output 245 of the straight-line detection routine 240 and a plurality of other parameters 205 are provided as input to the enable criteria evaluation routine 250. Other parameters 205 that may be evaluated as enable criteria include, e.g., vehicle speed, sensor validity/diagnostics test results, transmission range, axle torque, a trailer brake active signal, an anti-lock brake active signal, a traction control active signal, and an electronic spark control active signal. The enable criteria evaluation routine 250 evaluates the aforementioned parameters 205 to determine whether there exists a sensor or system fault or a powertrain or vehicle operating condition that may preclude execution of either the event-based mass estimation routine 400 or the recursive estimation method 600 because a resultant vehicle mass estimate may be corrupted or otherwise inaccurate. The enable criteria evaluation routine 250 generates an output that indicates whether an ensuing execution of either the recursive estimation method 600 or the event-based estimation method 400 will yield a valid result based upon an evaluation of the aforementioned parameters 205.

The event-based mass estimation routine 400 dynamically determines a first estimate of the vehicle mass 275 based upon the longitudinal force Fx 237 and a longitudinal acceleration 207. Inputs include an output 225 from the event detection routine 220 that monitors parameters 202 to detect acceleration events, deceleration events, cruise control events, coasting events and other events. The monitored parameters 202 include vehicle speed, brake pedal position and accelerator pedal position. The results of the event detection routine 220 are communicated to the event-based mass estimation routine 400 for analysis. Inputs also include a triggering routine 210, which monitors parameters 201 to select outputs 215 that will detect acceleration events, deceleration events, cruise control events, coasting events and other events that can be employed by the event-based mass estimation routine 400. The monitored parameters 201 include, e.g., vehicle speed and vehicle speed setpoints.

The event-based mass estimation routine 400 is a method, in the form of algorithms and other routines, in which the dynamically-determined parameters related to the longitudinal force 237 and the longitudinal acceleration 207 are captured during specific events and employed to determine the first estimate of the vehicle mass 275.

The specific events include transitioning from a first operating state to a second operating state, including a transition from vehicle acceleration to vehicle deceleration, a transition from vehicle acceleration to coasting, and a transition from vehicle deceleration to vehicle acceleration. During any of and each of the aforementioned operating state transitions, datapoints for the longitudinal force 237 and the longitudinal acceleration 207 are determined at a common selected vehicle speed, wherein the selected vehicle speed under the first operating state of the respective transition is equal to the selected vehicle speed under the second operating state of the respective transition. Relevant equations that relate the vehicle mass M with the longitudinal force 237 and the longitudinal acceleration 207 include as follows:

$$M^* \Delta a_x = \Delta F_x \quad [3]$$

wherein:

M represents vehicle mass, $\Delta a_x = a_{x,B} - a_{x,A}$ wherein $a_{x,A}$ represents longitudinal acceleration at the vehicle speed during the first operating state and $a_{x,B}$ represents longitudinal acceleration at the vehicle speed during the second operating state, and $\Delta F_x = F_{b,B} - F_{d,A}$ during a transition from acceleration to deceleration, $= F_{d,B} - F_{b,A}$ during a transition from deceleration to acceleration, and $= -F_{d,A}$ during a transition from acceleration to coasting;

wherein:

$F_{b,A}$ represents a braking force exerted by the vehicle brakes on the vehicle wheels under the first operating state at the selected vehicle speed, $F_{b,B}$ represents a braking force exerted by the vehicle brakes on the vehicle wheels under the second operating state at the selected vehicle speed, $F_{d,A}$ represents a driving force exerted by the vehicle propulsion system on the drive wheels under the second operating state at the selected vehicle speed.

The event-based mass estimation routine 400 employs data captured during one or a plurality of the transition events to determine the first estimate of the vehicle mass 275. Because the selected vehicle speed under the first operating state of the respective transition is equal to the selected vehicle speed under the second operating state of the respective transition for the event, and because the first and second operating states of the respective transition occur within a short window of time, effects of wind force, road friction, sensor bias, and vehicle pitch are effective equivalent and are thus cancelled out.

Figures 1, 4:
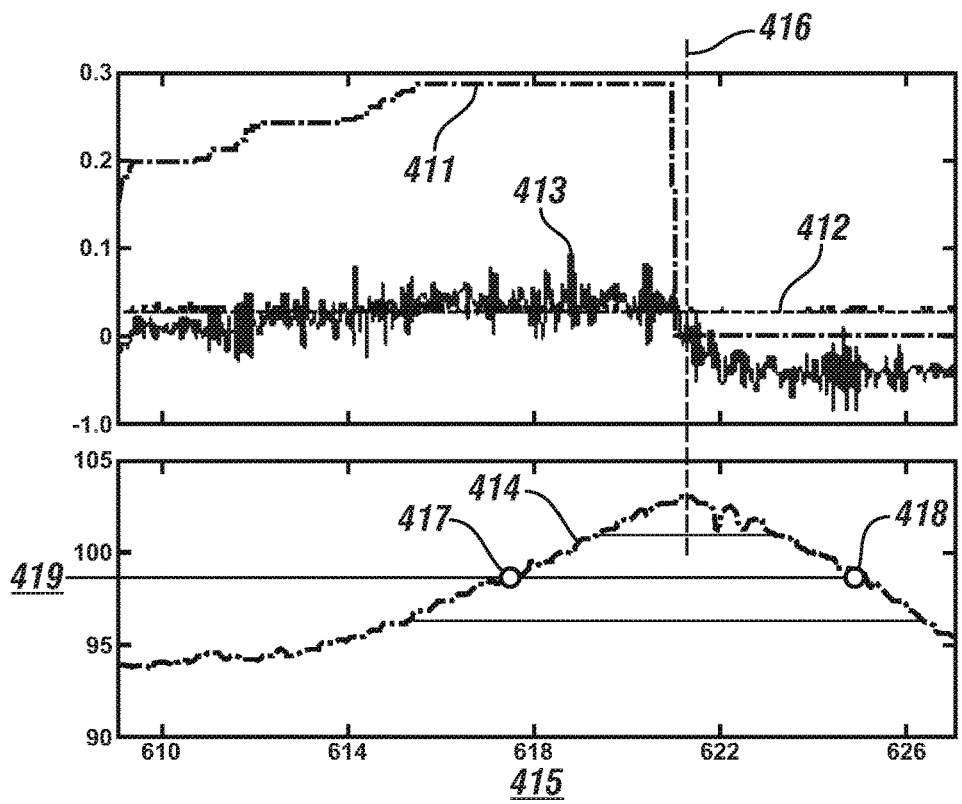
Figures 2, 4:
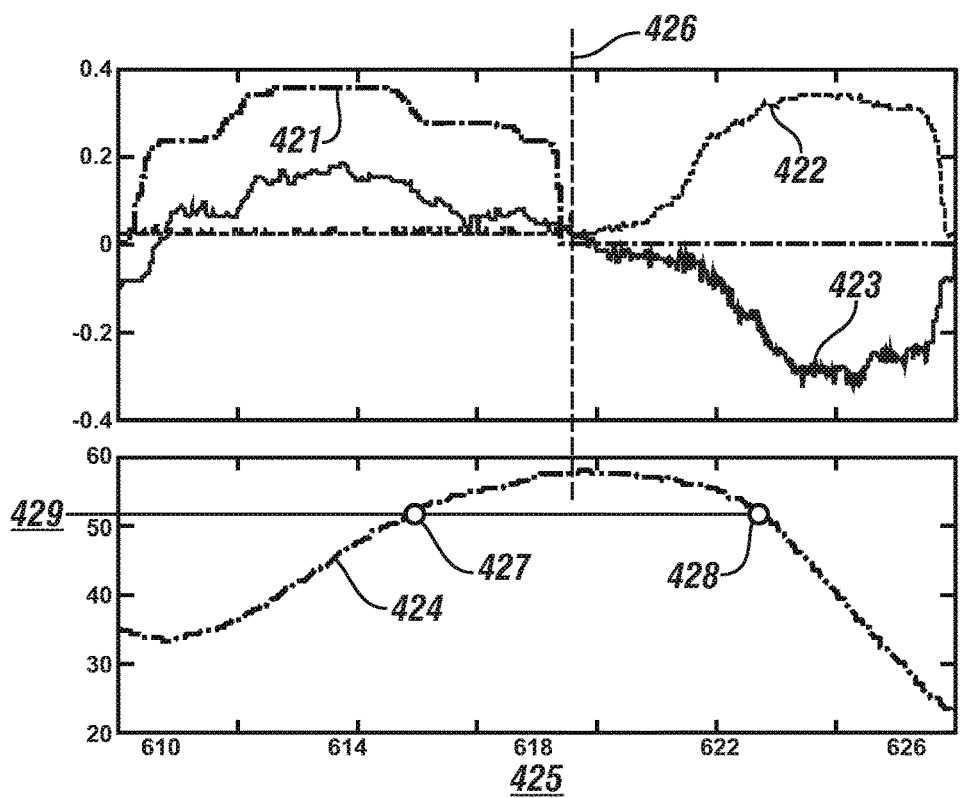

FIG. 4-1 graphically shows aspects related to the event-based mass estimation routine 400, including a first example of a transition from a first operating state (state A) to a second operating state (state B), including a transition from vehicle acceleration to vehicle coasting. Plotted data includes accelerator pedal position 411, brake pedal position 412, vehicle longitudinal acceleration 413, and vehicle longitudinal speed 414 in relation to time 415, which is indicated on the horizontal axis. A transition from vehicle acceleration to coasting is indicated at line 416. A first datapoint 417 associated with state A, i.e., acceleration, and a second datapoint 418 associated with state B, i.e., coasting, are indicated, and occur at a selected vehicle speed 419, which is the same magnitude for vehicle acceleration and vehicle coasting. The controller 20 is configured to capture and record datapoints for the longitudinal force and the longitudinal acceleration at the selected vehicle speed 419 at state A and at state B. The longitudinal force and the longitudinal acceleration at the selected vehicle speed 419 may be employed to determine the first estimate of the vehicle mass 275 during the transition, employing the relationship described with reference to Eq. 3.

FIG. 4-2 graphically shows aspects related to the event-based mass estimation routine 400, including a second example of a transition from a first operating state to a second operating state, including a transition from vehicle acceleration to vehicle deceleration. Plotted data includes accelerator pedal position 421, brake pedal position 422, vehicle longitudinal acceleration 423, and vehicle longitudinal speed 424 in relation to time 425, which is indicated on the horizontal axis. A transition from vehicle acceleration to deceleration is indicated at line 426. A first datapoint 427 associated with the first operating state, i.e., acceleration, and a second datapoint 428 associated with the second operating state, i.e., deceleration, are indicated, and occur at a selected vehicle speed 429, which is the same magnitude for vehicle acceleration and vehicle deceleration. The controller 20 is configured to capture and record datapoints for the longitudinal force and the longitudinal acceleration at the selected vehicle speed 429. The longitudinal force and the longitudinal acceleration at the selected vehicle speed 429 may be employed to determine the first estimate of the vehicle mass 275 during the transition, employing the relationship described with reference to Eq. 3.

An outlier removal step 500 is executed to detect and remove or otherwise compensate for presence of outlier data associated with the first estimate of the vehicle mass 275 that may be generated by the event-based estimation method 400. An outlier in the first estimate of the vehicle mass 275 may occur when capture of data associated with the longitudinal force 237 is not synchronized with capture of data associated with the longitudinal acceleration 207, due to signal latencies, etc. The presence of outliers can reduce the overall estimation accuracy and robustness.

The event-based estimated mass values as generated by the event-based estimation method 400 can be evaluated in context of a calibrated confidence level to detect and remove outliers from the event based estimations. With outlier compensation, the overall estimation accuracy and robustness can be significantly improved. In one embodiment, a confidence band of maximum and minimum values for the estimated vehicle mass can be established, as follows:

$$\text{Max}(M_{event}) = M_{KF}(1 + CI\%)$$

$$\text{Min}(M_{event}) = M_{KF}(1 - CI\%) \quad [4]$$

wherein:

$M_{KF}$ is vehicle mass as estimated by the recursive estimation method 600, $\text{Max}(M_{event})$ is a maximum permissible mass value for the event-based mass estimate, $\text{Min}(M_{event})$ is a minimum permissible mass value for the event-based mass estimate, and CI % is the calibrated confidence level.

Each of the event-based estimated mass values can be subjected to the confidence bands as calculated by Eq. 4. An event-based estimated mass value that is greater than the maximum permissible mass value for the event-based mass estimate $\text{Max}(M_{event})$ or less than the minimum permissible mass value for the event-based mass estimate $\text{Min}(M_{event})$ is labeled an outlier and is removed from further analysis, including not being output as the first estimate of the vehicle mass 275 from the event-based estimation method 400.

Figure 5:
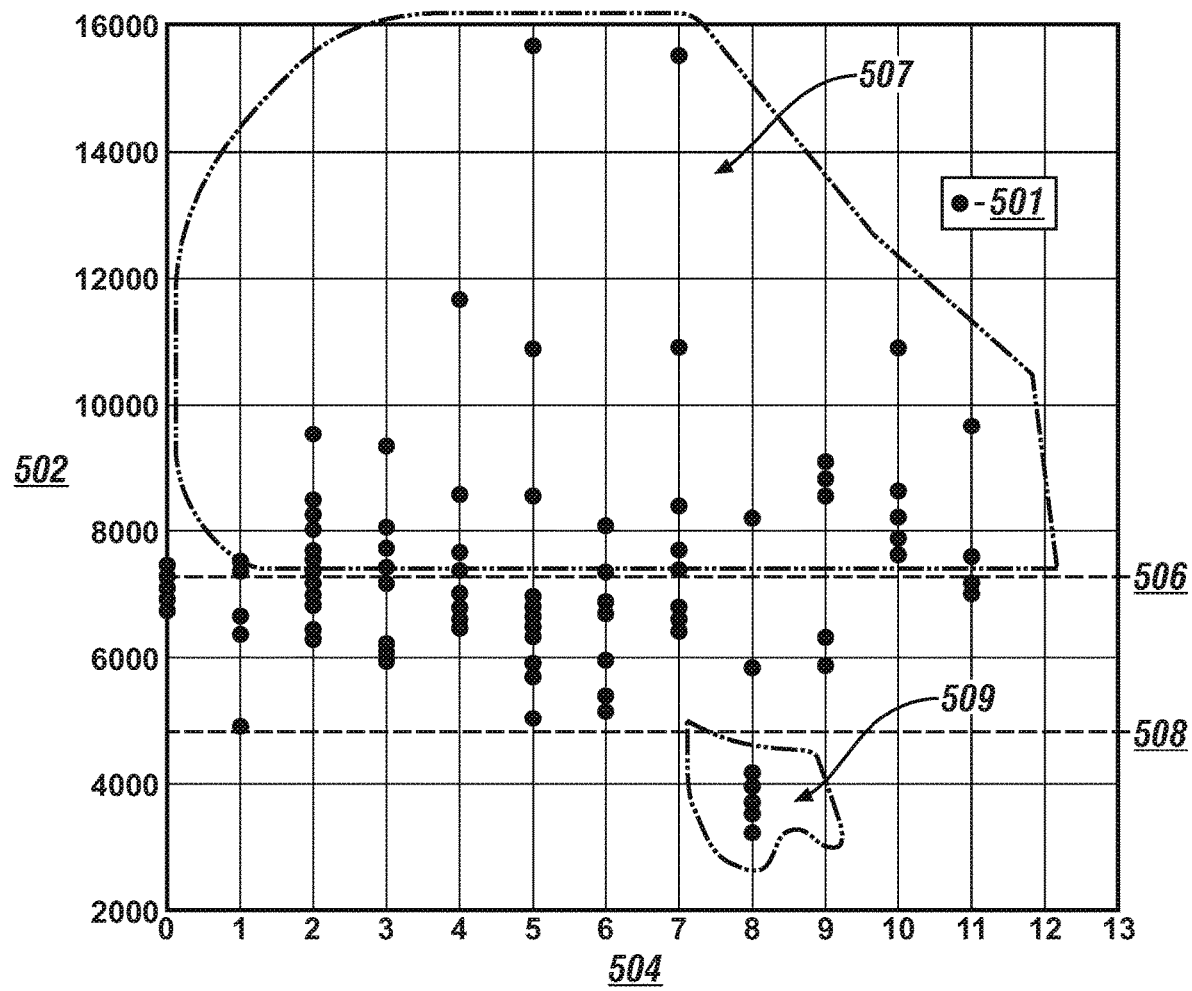
FIG. 5 graphically shows data associated with vehicle acceleration and deceleration events that may be employed to identify data outliers, in accordance with the disclosure.

FIG. 5 graphically shows a plurality of mass datapoints associated with vehicle acceleration and deceleration events that may be employed to identify data outliers, including estimated vehicle mass 502 on the vertical axis in relation to longitudinal vehicle speed 504 on the horizontal axis, wherein each of the mass datapoints 501 is indicated by a dot. A first line 506 representing a maximum permissible mass value for the event-based mass estimate $\text{Max}(M_{event})$ and a second line 508 representing a minimum permissible mass value for the event-based mass estimate $Min(M_{event})$ are indicated, wherein values for $Max(M_{event})$ and $Min(M_{event})$ are determined in accordance with the relationship described with reference to Eq. 4. Outliers are identified, including mass values that are greater than the maximum permissible mass value for the event-based mass estimate $Max(M_{event})$ 509 and mass values that are less than the minimum permissible mass value for the event-based mass estimate $Min(M_{event})$ 507. In such a manner, the vehicle mass as estimated by the recursive estimation method 600 can be employed as a standard to evaluate the event-based mass estimate that is determined employing the event-based estimation method 400.

Figure 6:
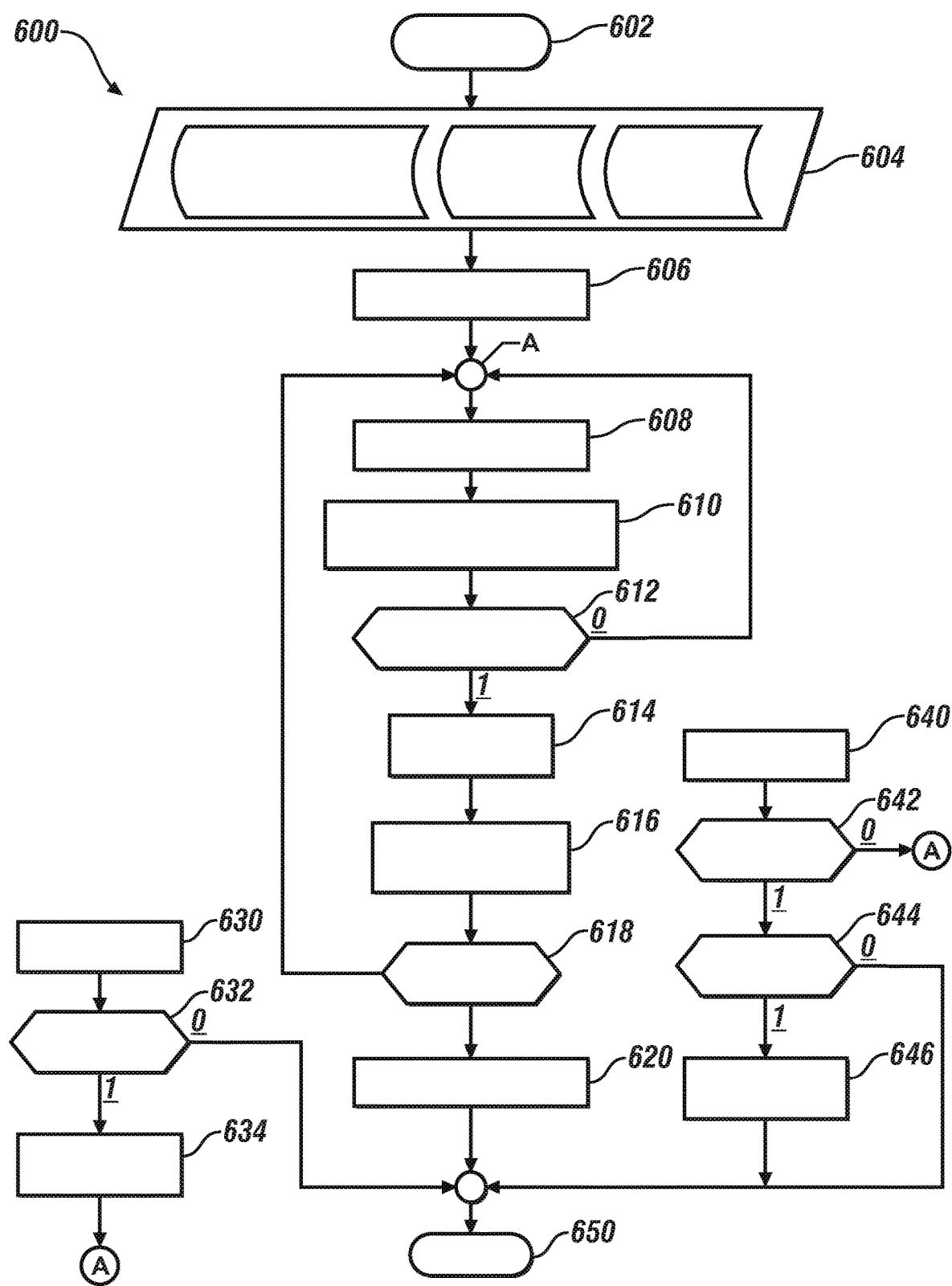
FIG. 6 schematically shows a recursive method that may be employed to dynamically estimate a second vehicle mass, in accordance with the disclosure.

FIG. 6 schematically shows an embodiment of the recursive estimation method 600 to dynamically determine a second estimate of the vehicle mass 285. Table 1 is provided as a key wherein the numerically labeled blocks and the corresponding functions are set forth as follows, corresponding to the recursive estimation method 600. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 602 | Start |
| 604 | Monitor sensors |
| 606 | Determine initial vehicle mass estimate |
| 608 | Recursively determine longitudinal force, acceleration |
| 610 | Check enable criteria |
| 612 | Is vehicle mass estimation enabled? |
| 614 | Update vehicle mass estimate |
| 616 | Determine convergence and calculate confidence level |
| 618 | Converged? |
| 620 | Update vehicle mass estimate |
| 630 | Check reset conditions |
| 632 | Reset vehicle mass estimate? |
| 634 | Use learned estimation value to establish initial vehicle mass estimate |
| 640 | Check communication link validity |
| 642 | Communication link fault? |
| 644 | Has previous vehicle mass estimate converged? |
| 646 | Use learned estimation value to establish initial vehicle mass estimate |
| 650 | End |

Execution of the recursive estimation method 600 may proceed as follows. The steps of the recursive estimation method 600 may be executed in a suitable order, and are not limited to the order described with reference to FIG. 6. As employed herein, the term "1" indicates an answer in the affirmative, or "YES", and the term "0" indicates an answer in the negative, or "NO".

As indicated with reference to FIG. 2, inputs to the recursive estimation method 600 include the longitudinal force Fx 237, which is determined via the longitudinal force estimation routine 235; trailer status 208 indicating presence or absence of a trailer 50 or another towed vehicle; output from the enable criteria evaluation routine 250 indicating whether the ensuing execution of the recursive estimation method 600 will yield a valid result; and, vehicle wind resistance, which is output from a wind resistance estimating routine 260. The wind resistance estimating routine 260 determines vehicle wind resistance based upon a plurality of input parameters 206 that include the vehicle speed, longitudinal acceleration, and outside air temperature.

The recursive estimation method 600 starts (602), including capturing and processing signal data 208 from several of the vehicle sensors that are described with reference to FIG. 1 to determine states of parameters related to longitudinal acceleration, yaw rate, steering angle, vehicle speed, braking request, operation of traction control, stability control, presence of a towed vehicle such as a trailer, trailer braking command, drive wheel axle torque, transmission gear or range state, environmental air temperature, etc. (604). An initial vehicle mass estimate is determined (606), and is based upon vehicle curb weight, trailering connection status, and passenger counts, which may be determined by a count of seat belt interlocks. The longitudinal force and longitudinal acceleration are determined from the states of the parameters as monitored by the aforementioned vehicle sensors.

Subsequent operation includes recursively determining the longitudinal force $F_x$ and longitudinal acceleration $A_x$ (608), verifying enable criteria are valid (610), and when the enable criteria are valid (612)(1), updating the vehicle mass estimate (614) based upon the relationship described as follows:

$$m = F_x/A_x \qquad [5]$$

wherein:
$F_x$ represents Force, i.e., longitudinal force,
m represents vehicle total mass, and
$A_x$ represents longitudinal acceleration.
and determining estimation convergence and an estimated confidence level in the vehicle mass estimate (616). Convergence checking includes a series of checks, accumulated estimation enabling time duration check and standard deviation check. The step of updating the vehicle mass estimate (614) includes employing Kalman filtering or other forms of estimation to predict and update the vehicle mass estimate based upon the states of parameters related to longitudinal acceleration, yaw rate, steering angle, vehicle speed, braking request, operation of traction control, stability control, presence of a towed vehicle such as a trailer, trailer braking command, drive wheel axle torque, transmission gear or range state, environmental air temperature, etc. The step of verifying the enable criteria includes verifying that the vehicle sensors are operational, and verifying that the states of parameters related to longitudinal acceleration, yaw rate, steering angle, vehicle speed, braking request, operation of traction control, stability control, presence of a towed vehicle such as a trailer, trailer braking command, drive wheel axle torque, transmission gear or range state, environmental air temperature, etc. are within acceptable, preset ranges.

When there has been no convergence of the estimation of the vehicle mass estimate (618)(0), the process returns to determine the longitudinal force and longitudinal acceleration based upon updated data from the monitored sensors (604), (608), and another iteration of the process steps 608, et seq., commences.

When there is estimation convergence (618)(1), the vehicle mass estimate is updated (620), that vehicle mass estimate is communicated to the controller 20 for use in vehicle control routines, and this iteration ends (650).

Furthermore, presence or occurrence of changes that may initiate a reset of the vehicle mass estimate are periodically evaluated (630). This includes reviewing states of parameters related to vehicle speed, transmission gear, and trailer connection or trailer disconnection. When there is a change that necessitates a reset (632)(1), the process updates the initial vehicle mass estimate to be the most recent estimate of the vehicle mass estimate (634), and returns to determine the longitudinal force and longitudinal acceleration based upon updated data from the monitored sensors (604), (608), and another iteration of the process steps 608, et seq., commences. When there is no change that necessitates a reset (632)(0), the most recently determined vehicle mass estimate is communicated to the controller 20 for use in vehicle control routines, and this iteration ends (650).

Furthermore, presence or occurrence of a communication link fault may initiate a reset of the vehicle mass estimate (640). This includes reviewing the communication link. When no communication link fault is detected (642)(0), the process returns to determine the longitudinal force and longitudinal acceleration based upon updated data from the monitored sensors (604), (608), and another iteration of the process steps 608, et seq., commences.

When a communication link fault is detected (642)(1), the process determines whether the previously determined vehicle mass estimate has converged (644), and if so (644)(1), that vehicle mass estimate is communicated to the controller 20 for use in vehicle control routines, and the vehicle mass estimate is captured for use as the initial vehicle mass estimate in subsequent iterations of the recursive estimation method (646). When the previously determined vehicle mass estimate has not converged (644)(0), this iteration ends (650).

Referring again to FIG. 2, the integration step 700 executes to dynamically determine the final vehicle mass 295, which is communicated to vehicle control systems 290 for operational control of the vehicle 10, after convergence has occurred and after the outliers have been removed. Inputs to the integration step 700 include the first estimate of the vehicle mass 275 that is determined employing the event-based estimation method 400 and the second estimate of the vehicle mass 285 that is determined employing the recursive estimation method 600. The integration step 700 includes combining the first estimate of the vehicle mass 275 and the second estimate of the vehicle mass 285 employing a weighted average method or another method. The final vehicle mass 295 is communicated via the communication link, and is employed in one or a plurality of vehicle control systems to dynamically adjust control parameters to account for vehicle mass during a trip, including dynamically adapting for presence or absence of trailer towing. Vehicle control systems that may utilize the final vehicle mass 295 include, for example, vehicle dynamic stability controls including yaw control, vehicle braking controls including integrated trailer brake boost function, brake system prognostics, cruise control, high-voltage or low-voltage battery charging and discharging routines, steering control routines including adaptive steering, etc.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for dynamically determining a mass of a vehicle, wherein the vehicle includes a propulsion system coupled to a drive wheel, the method comprising:
monitoring vehicle operating conditions;
executing an event-based estimation method based upon the vehicle operating conditions to determine a first vehicle mass state;
executing, via a controller, a recursive estimation method based upon the vehicle operating conditions to determine a second vehicle mass state; and determining a final vehicle mass based upon the first and second vehicle mass states;
wherein executing the event-based estimation method based upon the vehicle operating conditions to determine the first vehicle mass state comprises:
determining a longitudinal force and a longitudinal acceleration at a selected vehicle speed during a first operating state;
transitioning to a second operating state;
determining a longitudinal force and a longitudinal acceleration at the selected vehicle speed during the second operating state; and
determining the first vehicle mass state based upon a difference between the longitudinal acceleration at the selected vehicle speed during the first operating state and the longitudinal acceleration at the selected vehicle speed during the second operating state.

2. The method of claim 1, wherein executing the recursive estimation method based upon the vehicle operating conditions to determine the second vehicle mass state comprises:
recursively determining a longitudinal acceleration of the vehicle and an axle torque being transferred from the propulsion system to the drive wheel based upon the monitored vehicle operating conditions; and
determining the second vehicle mass state based upon the recursively determined longitudinal acceleration and the axle torque.

3. The method of claim 2, comprising determining the longitudinal acceleration based upon input from an inertial measurement sensor.

4. The method of claim 2, wherein determining the second vehicle mass state based upon the recursively determined longitudinal acceleration and the axle torque comprises executing a Kalman filter to determine the second vehicle mass state based upon the recursively determined longitudinal acceleration and the axle torque.

5. The method of claim 2, comprising recursively determining the longitudinal acceleration of the vehicle and coincidently determining the axle torque being transferred to the vehicle.

6. The method of claim 1, further comprising determining that the vehicle is operating in a straight-line state as a condition-precedent to executing the event-based estimation method and executing the recursive estimation method.

7. The method of claim 1, wherein the vehicle includes a plurality of vehicle wheels including the drive wheel, the method further comprising determining the first vehicle mass state based upon a braking force exerted on the vehicle wheels under the first operating state at the selected vehicle speed, a braking force exerted on the vehicle wheels under the second operating state at the selected vehicle speed, and a driving force exerted by the propulsion system on the drive wheel at the selected vehicle speed.

8. The method of claim 1, wherein the first operating state comprises a vehicle acceleration event and the second operating state comprises a vehicle deceleration event.

9. The method of claim 1, wherein the first operating state comprises a vehicle acceleration event and the second operating state comprises a vehicle coasting event.

10. The method of claim 1, wherein the first operating state comprises a vehicle deceleration event and the second operating state comprises a vehicle acceleration event.

11. The method of claim 1, wherein executing the event-based estimation method based upon the vehicle operating conditions to determine the first vehicle mass state comprises:
determining a loaded wheel radius for the drive wheel;
determining an axle torque;
determining vehicle longitudinal force based upon the loaded wheel radius and the axle torque; and
determining the first vehicle mass state based upon the vehicle longitudinal force.

12. The method of claim 11, wherein determining the vehicle longitudinal force based upon the loaded wheel radius comprises:
determining the loaded wheel radius for the drive wheel based upon a rotational speed of the drive wheel and a longitudinal speed of the vehicle,
determining a deflection of the drive wheel based upon the loaded wheel radius; and
determining the vehicle longitudinal force based upon the deflection of the drive wheel and the axle torque.

13. The method of claim 1, wherein the vehicle includes a plurality of vehicle wheels including the drive wheel, and wherein executing the event-based estimation method based upon the vehicle operating conditions to determine the first vehicle mass state comprises:
determining a loaded wheel radius for each of the vehicle wheels;
determining a total vehicle longitudinal force based upon the radii for all of the vehicle wheels; and
determining the first vehicle mass state based upon the vehicle longitudinal force.

14. The method of claim 1, further comprising controlling vehicle operation based upon the final vehicle mass.

15. The method of claim 1, wherein determining the final vehicle mass based upon the first and second vehicle mass states comprises determining a weighted average of the first and second vehicle mass states.

16. The method of claim 15, further comprising:
identifying outliers associated with execution of the event-based mass estimation method;
removing the outliers from the event-based mass estimations; and
determining the weighted average of the first and second vehicle mass states after the outliers associated with execution of the event-based mass estimation method have been removed.

17. A method for controlling operation of a vehicle, wherein the vehicle includes a propulsion system and a plurality of vehicle wheels, comprising:
monitoring vehicle operating conditions;
determining a vehicle wheel radius for each of the vehicle wheels based upon the vehicle operation conditions;
determining a first vehicle longitudinal force based upon the vehicle wheel radius for each of the vehicle wheels;
executing an event-based estimation method to determine a first vehicle mass state based upon the first vehicle longitudinal force;
executing a recursive estimation method to determine a second vehicle mass state based upon the vehicle operating conditions;
determining a final vehicle mass based upon the first and second vehicle mass states; and
controlling vehicle operation based upon the final vehicle mass.

18. A vehicle, including:
a body disposed on a plurality of vehicle wheels via a suspension system;
a propulsion system configured to transfer propulsion torque to one of the vehicle wheels;
a plurality of sensors disposed to monitor the vehicle wheels, the body, the suspension system and the propulsion system; and
a controller, in communication with the plurality of sensors and operatively connected to the propulsion system and the suspension system, the controller including an instruction set, the instruction set executable to:
monitor, via the plurality of sensors, vehicle operating conditions;
determine a vehicle wheel radius based upon the vehicle operation conditions;
determine a first vehicle longitudinal force based upon the vehicle wheel radius;
execute an event-based estimation method to determine a first vehicle mass state based upon the first vehicle longitudinal force;
execute a recursive estimation method to determine a second vehicle mass state based upon the vehicle operating conditions;
determine a final vehicle mass based upon the first and second vehicle mass states; and
control operation of one of the propulsion system and the suspension system based upon the final vehicle mass.

* * * * *